United States Patent [19]

Weinberg et al.

[11] 4,178,401
[45] Dec. 11, 1979

[54] PACKAGING FILM COMPRISING A BLENDED SELF-WELDING LAYER

[75] Inventors: Alan S. Weinberg, Greenville; Joseph Z. Sun, Spartanburg, both of S.C.

[73] Assignee: W. R. Grace & Co., Duncan, S.C.

[21] Appl. No.: 868,158

[22] Filed: Jan. 9, 1978

[51] Int. Cl.² .................... B32B 27/08; D03D 35/00; A21D 10/02
[52] U.S. Cl. .................... 428/35; 428/475; 428/476; 428/483; 428/516; 428/520; 428/517; 428/518; 428/519; 264/22; 138/137; 138/141; 138/177; 426/127; 206/497; 525/229
[58] Field of Search .................... 428/516–520, 428/35, 476.3, 475.8, 476.9, 476.1, 483; 260/897

[56] References Cited

U.S. PATENT DOCUMENTS

| 3,682,767 | 8/1972 | Britton et al. | 428/518 X |
| 3,741,253 | 6/1973 | Brax et al. | 428/520 |
| 3,817,821 | 6/1974 | Gallini | 428/516 |
| 3,832,270 | 8/1974 | Schirmer | 428/518 |
| 3,900,635 | 8/1975 | Funderburk, Jr. et al. | 428/516 |
| 3,932,693 | 1/1976 | Shaw et al. | 428/519 |
| 4,044,187 | 8/1977 | Kremkau | 428/518 |
| 4,058,647 | 11/1977 | Inoue et al. | 428/520 |

*Primary Examiner*—P. C. Ives
*Attorney, Agent, or Firm*—John J. Toney; William D. Lee, Jr.; John B. Hardaway

[57] ABSTRACT

This invention is a self-welding packaging film made by blending at least two ethylene polymers, one of the polymers having a melt flow substantially greater than any of the other polymers in the blend, and thereafter extruding a film from the blend. The film may be self-supporting or it may be an inner layer in a multi-ply film. Preferred ethylene polymers for the blend are the ethylene-vinyl acetate copolymers wherein one copolymer has a melt flow of less than 5.0 and the other has a melt flow greater than 28.0.

13 Claims, 3 Drawing Figures

PACKAGING FILM COMPRISING A BLENDED SELF-WELDING LAYER

TECHNICAL FIELD

This invention relates to a flexible, thermoplastic packaging film which will adhere to itself within certain temperature ranges and is referred to as being "self-welding." In particular, this invention relates to a self-welding thermoplastic film for packaging fresh meat, dairy products, and poultry.

BACKGROUND ART

In the prior art self-adhering packaging films which are heat shrinkable are well known; and, likewise, heat shrinkable abuse resistant films which are relatively impervious to the passage of gas or moisture are also well known. Accordingly, a prime object of the subject invention is to combine the best qualities of both of these types of films into a single film or film laminate.

In making a self-welding film, particularly a self-welding film which is to be made into receptacles such as bags, three key factors must be balanced, namely: processability, sealability and seal strength, and self-welding ability. Processability concerns the ease with which a bag or receptacle may be made from film free of wrinkles and creases and, after being made, the ease with which a bag or receptacle may be opened and filled. Sealability concerns the relative speed of making bags and the strength of the heat seal which closes one end of the bag when the bag is made from flattened tubing. This primary closure seal is usually made with heated jaws under pressure. Self-welding ability concerns the ability of the material to adhere to itself at elevated temperatures. Therefore, it is another object of the present invention to provide a self-welding film which has an optimum combination of processability, sealability, and self-welding characteristics.

A typical prior art self-welding film is disclosed in U.S. Pat. No. 3,625,348 which issued on Dec. 7, 1971 to Oliver R. Titchenal et al. Set forth in the Titchenal et al patent is a bag made from a heat shrinkable multi-layer plastic film which has an inner layer of ethylene-vinyl acetate (also designated herein as "EVA" with accompanying percentage representing vinyl acetate content by weight) copolymer laminated to a layer of vinylidene chloride-vinyl chloride copolymer and then biaxially oriented. When an article is placed in the bag and the bag submerged in a hot water bath, the bag will shrink into conforming contact with the article and all the opposing contacting surfaces of the EVA copolymer layers will seal to each other. An advantage of such a bag structure is that upon puncture of the bag the multi-layer film remains in conforming contact with the article. However, the abuse resistance and strength of these prior art packages is not completely satisfactory for normal commercial usage where packages of large cuts of meat or large chunks of cheese will be transported and receive rough handling. Thus, it is an object of the present invention to provide an abuse resistant, self-welding packaging film which significantly improves package integrity.

In U.S. Pat. No. 3,741,253 which issued on June 26, 1973 to Harri J. Brax et al a packaging film having low oxygen permeability is disclosed. This packaging film is a three layer laminate having an inner layer of cross-linked EVA copolymer, a middle layer of vinylidene chloride copolymer, and an outer layer of an EVA copolymer. This packaging film has excellent abuse resistance but because the inner layer is irradiated or cross-linked to improve its strength and abuse resistance, it is limited in self-welding ability. Accordingly, it is another object of the present invention to provide an irradiated or cross-linked polymeric material which has superior self-adhering or self-welding characteristics.

As mentioned in the foregoing paragraphs, self-welding packaging films are most often made into pouches, bags, containers, or receptacles. For packaging fresh meats it is desirable that the container not only be self-welding but that it have low gas and moisture permeability and be heat shrinkable and abuse resistant because current packaging techniques require that fresh beef, for example, remain out of contact with air if it is to be stored chilled and unfrozen for periods in excess of 10 days. For such storage, beef products are preferably placed in a self-welding container, the container evacuated, and sealed with a heat seal or metal clip. After sealing, the bag is shrunk around the enclosed product by placing it in an elevated temperature medium such as a heat tunnel or hot water bath. In the self-welding bag or container the excess areas of the bag "weld" together after the bag has been shrunk. Self-welding provides a second seal should the clip or heat seal fail or the bag be punctured and the self-welding also will retard movement and seepage of blood and juices or "purge" within the package because the container material has welded to itself and there are no wrinkles or crevices in the material into which the purge can seep. Thus, an advantage to the present invention is that there is less loss due to defective clips or seals and the packaged product has an improved appearance by preventing the seepage of the juices into the unshrunk and unsealed areas of the bag.

The term "self-welding" is not defined in precise, measurable parameters but is a subjective term, and, a "self-welding" material is best defined as one which will adhere to itself in a contact seal and will stay welded through normal commercial distribution without external force so that the self-welded areas remain impenetrable to purge. The expression "without external force" means that the self-adherence or contact weld is maintained by the strength of the weld alone and is not due to any extraneous force pushing the film sheets or package walls together as would be the case when the interior of a bag is evacuated so that the bag walls collapse against themselves and are held in contact under the influence of atmospheric pressure.

As will be readily apparent to those skilled in the art the foregoing objects are accomplished by the present invention which is summarized below.

DISCLOSURE OF THE INVENTION

It has been surprisingly discovered that a self-welding packaging film having superior seal strength and abuse resistance as compared to other self-welding films can be made from a blend of at least two polymeric materials, at least one of which has a melt flow substantially greater than that of any of the other materials. The lower melt flow polymeric material is preferably a homopolymer, copolymer, or terpolymer of ethylene such as polyethylene or ethylene-vinyl acetate copolymer with a melt flow of less than 5.0. The higher melt flow material is preferably a copolymer or terpolymer of ethylene such as ethylene vinyl acetate copolymers or ionomeric resins having a minimum melt flow of about 28.0 and preferably in the range of 40 to 300. Of the measurable parameters it is believed that melt flow most accurately describes the desired characteristics of the materials as melt flow is function of both composition and molecular weight. Melt flow is determined by the procedure of ASTM-D1238, Condition E.

In one aspect of the invention, the blended film described in the foregoing paragraph forms the inner wall of a tubular, multi-layer film laminate where one of the additional laminate layers is a polymeric material exhibiting low gas permeability such as one of the copolymers of vinylidene chloride and vinyl chloride, one of the hydrolyzed ethylene-vinyl acetate copolymers, polyvinyl alcohol, a polyester, a polyamide, or an acrylonitrile copolymer. Preferably, the film laminate has been oriented so that a heat shrinkable receptacle such as a bag can be made from the tubular film by sealing one end of the tube.

In another aspect, the subject invention is a process for making a self-welding packaging film comprising the steps of blending at least two copolymers of ethylene and vinyl acetate, each copolymer having a different melt flow and the melt flow of one of said copolymers being substantially greater, of the order of 5 and up to 600 times greater, than that of any of the other copolymers; forming a substantially unstretched tube from said blend of copolymers; irradiating said tube to induce cross-linking in said copolymers; and, stretching said tube to film thickness.

In the preferred process it has been found that optimum self-welding and strength characteristics are achieved when said blend has been cross-linked to the degree which is induced by a radiation dosage in the range from about 0.5 to 2.5 MR or greater depending upon the specific polymer and its initial molecular weight.

In the preferred embodimemt of the process of the subject invention said blend of at least two copolymers is coextruded with one or more additional layers in tubular form with the blended copolymer forming the inner surface of the tube; and, after coextrusion, the tube is cooled, collapsed, and, if desired, irradiated to the optimum dosage level. The collapsed tubing is then heated to the orientation temperature range of one of the cross-linked materials in the tube; expanded to film thickness by the trapped bubble technique; rapidly cooled after expansion; and, again collapsed and wound up. Rapid cooling is necessary in order to bring the self-adhering surfaces below the temperature of self-adhesion before the bubble is collapsed.

DESCRIPTION OF THE DRAWINGS

In the drawings which are appended hereto and made a part of this disclosure.

BEST MODE OF CARRYING OUT THE INVENTION

Figure 1:
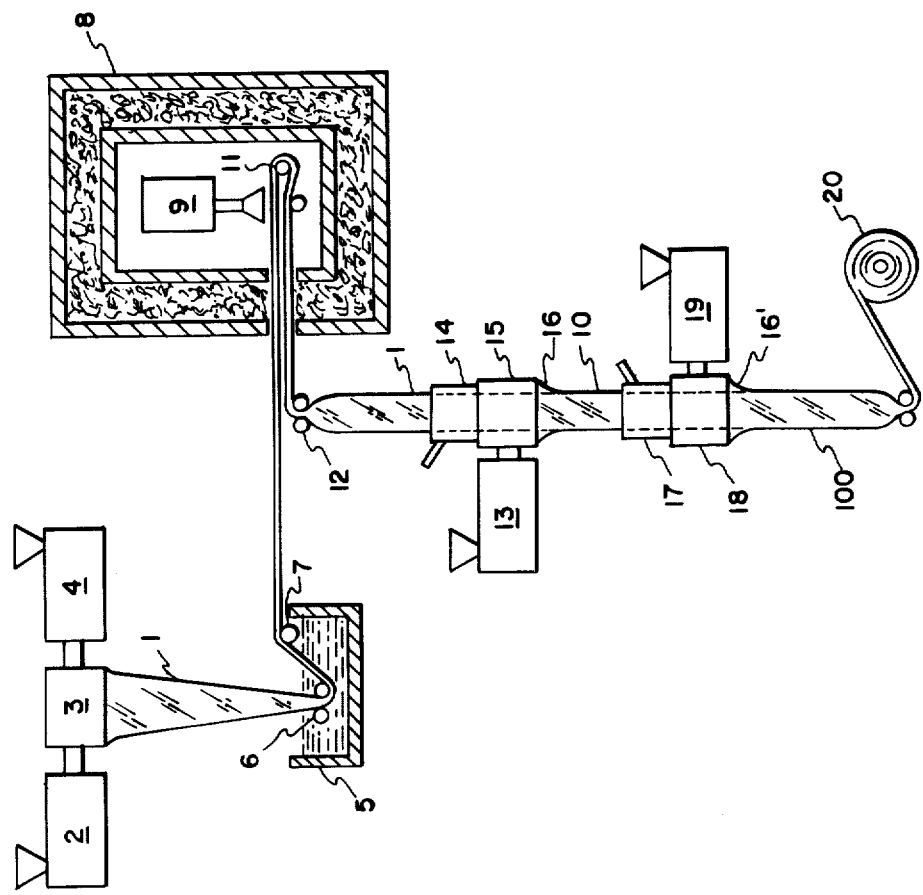
FIG. 1 is a schematic representation of the preferred process of making the self-welding packaging film of the present invention.

Turning first to FIG. 1, the preferred process of the subject invention will be described. Extruders 2 and 4 are shown feeding coextrusion die 3 to produce a multi-walled, tubular unexpanded film laminate 1. As is known in the art, a suitable release agent is maintained within the laminated tube 1. This laminate is chilled by bath 5 and collapsed by pinch rolls 6 and leaves the bath 5 over guide rolls 7. Extruders for thermoplastic materials and coextrusion dies fed by two or more extruders are well known in the art and are available from a number of manufacturers.

Extruder 2 which, by way of example, feeds the inner melt stream for die 3 to form the innermost annular die stream in die 3 is fed by a blend of polymeric resins wherein approximately 95% by weight of the blend is ethylene vinyl acetate copolymer having 18% vinyl acetate content by weight and a melt flow of 1.5 and approximately 5% of the blend is ethylene vinyl acetate copolymer having 30% vinyl acetate and a melt flow of 150. For the material for the outer or substrate layer of the two ply tube which emmerges from coextrusion die 3, extruder 4 is fed by an ethylene vinyl acetate copolymer resin containing 18% vinyl acetate and having a melt flow of 0.8. After the coextruded tubing leaves bath 5 over guide roll 7 it passes into shielded irradiation vault 8, through the beam from electron accelerator 9, over roll 11, and out of the vault to rollers 12. The electron beam produced by the accelerator is operated at an energy and current level such that the tube material receives a dosage of approximately 1.5 MR.

Upon moving through pinch rolls 12 the previously flattened and collapsed tubing is inflated to a round cross-section but not stretched beyond its originally extruded diameter. The inflated tubing next passes through vacuum chamber 14 and receives a layer on its outer surface as it passes through extrusion coating die 15 which is fed by extruder 13. The function of the vacuum chamber 14 is to remove air from around the tubing and to prevent any air bubbles from being trapped between the coating layer 16 and the tubing 14.

The extruder 13 is fed a vinylidene chloride copolymer blend. One particularly useful blend is one which comprises a mixture of 5% to 15% by weight of a copolymer of vinylidene chloride and vinyl chloride prepared by suspension polymerization and 95% to 85% by weight of a copolymer of vinylidene chloride and vinyl chloride prepared by emulsion polymerization where each of said copolymers contains from 15% to 30% by weight of vinyl chloride as set forth in the above mentioned Brax et al patent.

After receiving the vinylidene chloride copolymer coating, the two ply tube is now three ply tube 10 which is fed through a second vacuum chamber 17 and through a second extrusion coating die 18 which is fed by extruder 19. Melt 16' is coated onto the tubing 10 to form four ply tubing 100. The extruder 19 is fed the same polymeric material as extruder 4, namely, ethylene vinyl acetate copolymer having 18% vinyl acetate and 0.8 melt index. After cooling, the tubing is collapsed and wound up into roll 20.

Figure 2:
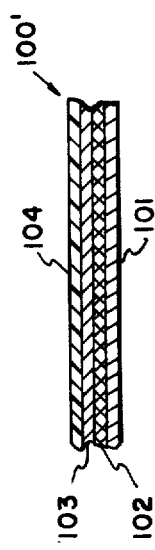
FIG. 2 is a schematic representation of the process of stretching the film made in the process of FIG. 1; and, FIG. 3 is a schematic representation of the cross-section of the packaging film of the present invention made according to the process shown in FIGS. 1 and 2.

In FIG. 2 the four ply tubing 100 from roll 20 is unwound and fed through hot water bath 21 which is maintained at approximately 170° F. (94° C.) which is within the orientation temperature range of the irradiated ethylene-vinyl acetate copolymer layer coextruded from extruder 4. As the collapsed tubing 100 leaves the water bath 21 and passes through pinch rollers 22, it is expanded into bubble 200 by inflating the tubing and trapping the inflated portion or bubble between pinch rollers 22 and 24. The inner layer of the laminated tubular film, which is the irradiated blend of ethylene vinyl acetate copolymers, has been raised to its melting temperature range by the hot water bath and the flattened tube walls are separable while hot so bubble 200 can be formed. However, this layer must be cooled below its self-adhering temperature before it is collapsed and wound up or it will completely adhere to itself in the wind up roll 25. Air rings 201, 300, and 301 surround the bubble 200 and chilled air is delivered to them. The chilled air impinges uniformly on the bubble surface to cool the inner layer below its self-adhering temperature range before the bubble is collapsed.

Figure 3:
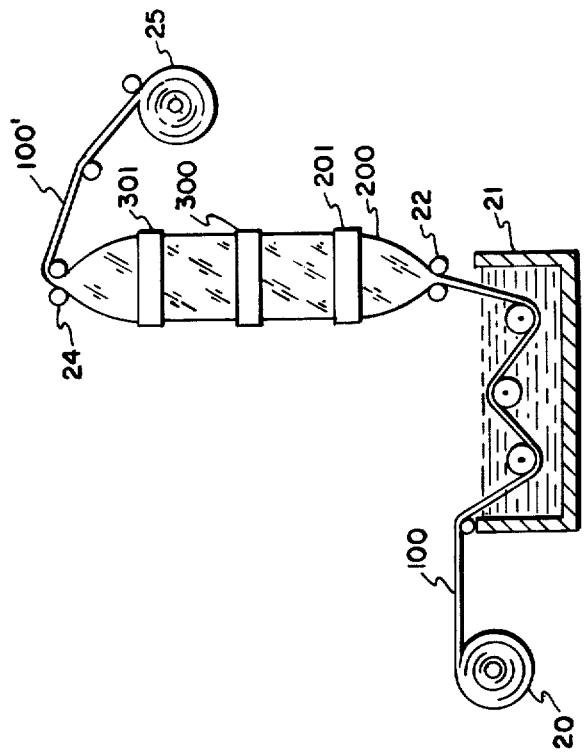

A cross-section of the expanded film 100' is represented by FIG. 3 where inner layer 101 comprises the crosslinked blend of EVA copolymers, the substrate layer 102 comprises cross-linked ethylene vinyl acetate copolymer, the relatively gas impermeable layer 103 comprises a blend of vinylidene chloride copolymers, and the outer layer 104 comprises uncross-linked ethylene vinyl acetate copolymer. This four ply material has low gas and moisture permeability, has excellent abuse resistance and structural strength, heat shrinkability and self-weldability. The film 100' in its flattened tubular condition as it is wound up to roll 25 in FIG. 2 may be transversely sealed and severed to form bags which are heat shrinkable and self-weldable.

To demonstrate the sealability of the above described film, bags were made from the lay flat expanded tubing 100' by transversely sealing the tubing with a conventional electric resistance, heat sealing bar. These bags were filled with boneless bottom rounds of beef weighing 50 to 100 lbs. each. These large rounds are considered one of the most difficult cuts to package as they are readily distortable and can exert hydraulic pressure in all directions. The seals had a comparable survival rate as compared to seals in bags made according to the above mentioned Brax et al patent under similar conditions. Thus, the material according to the present invention is not only self-welding it also achieves satisfactory commercial seal strength which is quite unexpected in a self-welding material which is subjected to high shrink tension in the softening range or crystalline melt range of the self-welding material.

EMBODIMENTS OF THE PACKAGING FILM

Preferred packaging films according to the subject invention are described in the examples set forth below. In each example the self-welding material comprises a blend of at least two polymers which have differing melt flows. In general, it has been found that the most satisfactory blends are those where one of the polymers is an ethylene copolymer or terpolymer having a high melt flow, i.e. in the range of 40 to 300. The other polymer is preferably a homopolymer, copolymer, or terpolymer of ethylene having a melt flow from about 0.25 to 3.0. The thickness of the film or layer formed from the blend preferably ranges from about 0.1 to 0.4 mils. Satisfactory self-sealing characteristics and seal abuse resistance could not be achieved in films comprising unblended ethylene homopolymers or copolymers.

EXAMPLE (1)

Example (1) is one of the preferred film laminates and is described above under the heading "Best Mode of Carrying Out The Invention" wherein the self-welding layer comprises a blend of 95% by weight of an EVA copolymer having 18% vinyl acetate (melt flow = 1.5) and 5% by weight of an EVA copolymer having 30% vinyl acetate (melt flow = 150). In addition to being the layer in a four ply laminate as described, the copolymer blend can be formed into a self-supporting film. If self-weldability and heat shrinkability are the desired characteristics of the film and low gas permeability is not a prime object, then the outer two layers of the preferred embodiment can be dispensed with and a two layer film laminate having the EVA copolymer blend as the inner layer and the 9% EVA substrate as the outer layer and having both layers cross-linked will be a quite satisfactory heat shrinkable, self-welding film having excellent processability, sealability, and self-adherence.

The four ply laminate of this Example which was oriented from a hot water bath at approximately 200° F. (94° C.) will heat shrink when reheated to approximately that same temperature range.

EXAMPLE (2)

Another preferred film was prepared according to the best mode above and the inner or self-welding layer and the gas impermeable layer were the same as that used in Example (1). However, the substrate layer comprised EVA copolymer with 12% vinyl acetate having a melt flow of 0.3. This same material comprised the outer layer. The film laminate was oriented from a hot water bath maintained at approximately 200° F. (94° C.) so that it would heat shrink within that same temperature range. An excellent film was obtained and bags made therefrom exhibited the desired combination of processability, self-adherence, and seal strength.

EXAMPLE (3)

A tubing with a substrate layer and an inside self-welding layer was coextruded according to the process of the preferred embodiment. Prior to stretching, the tubing had a diameter of 3⅛ inches, the self-welding layer was 2 mils thick and the substrate layer was 15 mils thick. The self-welding layer comprised a mixture of two EVA copolymers, the first being a copolymer with a vinyl acetate content of 25% by weight and a melt flow of 17 and the second having a vinyl acetate content of 30% by weight and a melt flow of 6. The substrate layer was an EVA copolymer with 9% vinyl acetate and a 3.0 melt flow. After cooling, the tubing was irradiated to a dosage level of 6.5 MR. Next, the tubing was coated with the same gas impervious material as used in Example (1) and the coating thickness of this material was 4 mils. The outer layer comprised the same EVA copolymer as the substrate layer and its thickness was 7 mils. This four ply tubing was then passed through a hot bath at a temperature of approximately 200° F. (94° C.) and expanded into tubing having a 12 inch diameter. This film had excellent heat shrinkability and self-weldability, but its sealability and processability were not as satisfactory as the films of Examples (1) and (2).

EXAMPLE (4)

A three ply tubular film was made by extruding the inner or self-welding layer as a tube with 17 mil walls, the tube being of the same material as that in Example (1). This tubing was irradiated and a second layer, the gas impervious material of Example (1), was extrusion coated onto the tubing after it was inflated in a manner similar to that taught by said Brax et al patent; and the third layer was the substrate material from Example (2) which was extrusion coated onto the impervious material. This three ply tubing was blown into tubular film as in the preferred embodiment. Bags made from this tubular film exhibited excellent self-welding at 180° F. (82° C.) to 185° F. (85° C.) with both boneless and bone-in meat products. At temperatures greater than 190° F. (88° C.) the shrinkage of the material is so great that no excess material is left to self-weld. No seal failures were encountered during the evaluation of this material.

In Table I below, the evaluation of eleven multi-layer, tubular, film structures is summarized. Each multi-layer film has a blended self-welding layer as the inner layer with the blend having the composition as specified and the inner layer is 2 to 3 mils thick prior to stretching. The middle layer and outer layer are of the same composition as the corresponding layers in the film of Example (1) above. Each tubular structure was formed into an 11"×30" bag and the bags were filled with sirloin tips, rib eyes and chuck rolls. Then the packages were sealed, shrunk, and then opened and evaluated by comparison with competitive packages made according to the above mentioned Titchenal et al patent.

nent should have a melt flow greater than 28.0 and preferably in the range of 40 to 300.

To determine if cross-linking the self-welding layer improved its properties, a three ply tube comprising an inner layer of EVA copolymer having 18% vinyl acetate and a melt flow of 1.5, a gas impervious layer according to the Example (1), and an outer layer comprising the same material as the inner layer was prepared. Three different samples of tubing were prepared, one receiving no irradiation, the next receiving irradiation dosage of 2 MR, and the third receiving a dosage of 4 MR. The tubing was then heated, blown into a bubble, cooled, collapsed, and made into bags. These bags were given the "burst test" as described above and bags receiving no radiation dosage survived an average of 9 seconds in the test, those receiving 2 MR survived 60 seconds and greater, and those receiving 4 MR survived an average of 14 seconds. Thus, it is concluded that irradiation increases the seal strength of the bags and that the maximum effectiveness of irradiation occurs at

TABLE I

| | Self-Welding Layer Composition | | | | | | |
|---|---|---|---|---|---|---|---|
| Example | Low Melt Flow Polymer | | | High Melt Flow Polymer | | | Evaluation of |
| No. | % Blend | Polymer | Melt Flow | % Blend | Polymer | Melt Flow | Performance |
| 5 | 70% | (1)<br>EVA (25%) | 17.3–20.9 | 30% | EVA (33%) | 38.0–48.0 | Good self-weldability<br>Poor processability |
| 6 | 70% | (2)<br>TP (28%) | 5.0–7.0 | 30% | EVA (33%) | 38.0–48.0 | Excellent self-weldability<br>Poor processability |
| 7 | 50% | TP (28%) | 5.0–7.0 | 50% | EVA (33%) | 38.0–48.0 | Excellent self-weldability<br>Poor processability |
| 8 | 40% | TP (28%) | 5.0–7.0 | 60% | EVA (25%) | 17.3–20.9 | Excellent self-weldability<br>Poor processability |
| 9 | 50% | TP (28%) | 5.0–7.0 | 50% | EVA (25%) | 17.3–20.9 | Good self-weldability<br>Poor processability |
| 10 | 30% | EVA (28%) | 5.3–6.7 | 70% | EVA (25%) | 17.3–20.9 | Best self-weldability<br>Poor processability |
| 11 | 50% | EVA (18%) | 9.0 | 50% | EVA (28%) | 22.0–28.0 | Good self-weldability<br>Poor processability |
| 12 | 100% | (3)<br>Ionomer | 1.4 | 0% | | | Good processability<br>Poor self-weldability |
| 13 | 70% | Ionomer | 1.4 | 30% | EVA (25%) | 17.3–20.9 | Good processability<br>Poor self-weldability |
| 14 | 70% | (4)<br>Ionomer | 4.4 | 30% | EVA (25%) | 17.3–20.9 | Good processability<br>Poor self-weldability |
| 15 | 70% | (5)<br>Ionomer | 1.4 | 30% | EVA (25%) | 17.3–20.9 | Good processability<br>Poor self-weldability |

(1) Ethylene-Vinyl Acetate Copolymer. Percentage following abbreviation, "EVA," is the weight percentage of vinyl acetate.
(2) Terpolymer of ethylene, vinyl acetate, and 4% to 8% methacrylic acid. Percentage following "TP" is vinyl acetate content.
(3) Surlyn ionomer 1650 by duPont. Melt flow by ASTM D-1238-65T.
(4) Surlyn ionomer 1652.
(5) Surlyn ionomer 1601. Melt flow by ASTM D-1238-62T In the examples in Table I above, polymers with melt flows in the range of 5 to 9 were blended with polymers having melt flows in the range of 17 to 28 in ratios from 30/70 to 70/30. Good to excellent self-welding was achieved but the processability was unsatisfactory. Likewise, polymers having even lower melt flow, in the range of 1.4 to 4.4, were blended with polymers having melt flows in the range of 17.3 to 20.9 in 70/30 ratios and, in one case, with 100% low melt flow polymer. In each instance the material processed well but did not possess sufficient self-adherence. To achieve the desired combination of self-adherence, sealability, and processability it has been discovered that one blend component should have a melt flow less than 5.0 and preferably in the range of 0.25 to 3.0 while the other blend component a dosage level in the proximity of 2 MR. Of course, the optimum dosage will be different for different polymers as some cross-link more readily than others. For example, low melt flow polymers have larger molecules and tend to have a greater probability for cross-linking and consequently show greater changes at lower dosages as the molecules develop cross-linked bonds. It has been found, in general, however, that cross-linking effects become noticeable at a dosage level of about 0.5 MR and that beyond a dosage level of about 4.0 MR the materials tend to become stiffer and the self-welding ability tends to diminish somewhat.

Having thus described our invention, we claim:
1. A self-welding packaging film comprising:
(a) a self-welding layer comprising a blend of at least two copolymers of ethylene-vinyl acetate, each copolymer having a different melt flow, the melt flow of one copolymer being less than 5.0 and the melt flow of another copolymer being greater than 28.0;

(b) a substrate layer comprising a cross-linked, heat shrinkable polymeric material said polymeric material selected from the group consisting of polyethylene and ethylene-vinyl acetate copolymers; and, (c) a layer having low gas permeability, the material for said layer being selected from the group consisting of:
  (1) copolymers of vinylidene chloride;
  (2) polyamides;
  (3) polyesters;
  (4) polyvinyl alcohol;
  (5) acrylonitrile copolymers; and,
  (6) hydrolized ethylene vinyl acetate copolymers; said substrate layer being located between the self-welding layer and the impermeable layer.

2. The self-welding film of claim 1 wherein the copolymers in said self-welding layer are cross-linked.

3. The self-welding film of claim 2 wherein the copolymers in said self-welding layer have been cross-linked to the degree which is induced by a radiation dosage of at least 0.5 MR.

4. The self-welding film of claim 2 wherein said blend comprises two copolymers, one having a melt flow in the range of 0.25 to 5.0 and the other having a melt flow in the range of 40 to 300.

5. The self-welding film of claim 2 wherein said substrate comprises an ethylene vinyl acetate copolymer having a vinyl acetate content of 20% by weight or less and said substrate and self-welding layer are irradiated to approximately the same degree.

6. The self-welding film of claim 2 wherein said film is in the form of a seamless tube and the self-welding layer forms the inner wall of said tube.

7. The self-welding film of claim 6 wherein said tube is sealed transversely to form a bag.

8. A self-welding packaging film comprising, in order:
  (a) a self-welding layer consisting of a blend of two copolymers of ethylene vinyl acetate, one copolymer having a melt flow in the range of 0.25 to about 3.0 and the other having a melt flow of at least approximately 150;
  (b) a substrate layer comprising a copolymer of ethylene vinyl acetate; said substrate layer being heat-shrinkable;
  (c) a layer comprising a copolymer of vinylidene chloride and vinyl chloride;
  (d) a layer comprising a copolymer of ethylene vinyl acetate;
  (e) said layers (a) and (b) having been crosslinked by irradiation at a dosage level in the range of 0.5 MR to 4.0 MR; and,
  (f) said film being self-welding in its heat-shrinking temperature range.

9. A multi-layer, self-welding packaging film comprising:
  (a) a self-welding layer comprising a blend of two polymers,
    (i) one polymer comprising the major portion of the blend and being selected from the group consisting of polyethylenes, ethylene-vinyl acetate copolymers, and ionomers having melt flows less than 5.0 and
    (ii) the other polymer comprising a minor portion of the blend and being selected from the group consisting of ethylene-vinyl acetate copolymers and ethylene terpolymers having melt flows greater than 28.0; and,
  (b) at least one additional film layer comprising a polymeric material selected from the group consisting of polyethylenes, ethylene-vinyl acetate copolymers, hydrolyzed ethylene-vinyl acetate copolymers, polyvinyl alcohols, copolymers of vinylidene chloride and vinyl chloride, polyamides, and acrylonitrile copolymers, said additional layer being heat shrinkable.

10. The self-welding packaging film of claim 9 wherein the polymers in said self-welding layer have been cross-linked to the degree which is induced by a radiation dosage 0.5 to 4.0 MR.

11. The self-welding film of claim 9 wherein the melt flow of the polymers of group (i) is in the range from 0.25 to 5.0 and the melt flow of the copolymers and terpolymers of group (ii) is in the range from 40 to 300.

12. The self-welding packaging film of claim 9 wherein said additional film layer is in the form of a seamless tube and the self-welding layer forms the inner wall of said tube.

13. The self-welding film of claim 9 wherein said blend comprises two ethylene-vinyl acetate copolymers.

* * * * *